United States Patent Office 3,438,429
Patented Apr. 15, 1969

3,438,429
METHOD AND APPARATUS FOR THE PREVENTION OF KNOCKS IN STEAM COILS
Willis Thompson Lawrence, Arlington, Mass., assignor, by mesne assignments, to Hooker Chemical Corporation, Niagara Falls, N.Y., a corporation of New York
Filed Oct. 10, 1967, Ser. No. 674,265
Int. Cl. F28d *15/00, 27/00;* F28b *11/00*
U.S. Cl. 165—1
15 Claims

ABSTRACT OF THE DISCLOSURE

A preheater for a heat transfer medium is provided to heat the transfer medium before it enters a heat storage vessel to prevent knocking within the passageway provided for heat transfer medium as it enters the hot heat storage material. A siphon break in the heat transfer conduit is provided to prevent knocking caused by sudden pressure fluctuations.

Background of the invention

Figure 1:
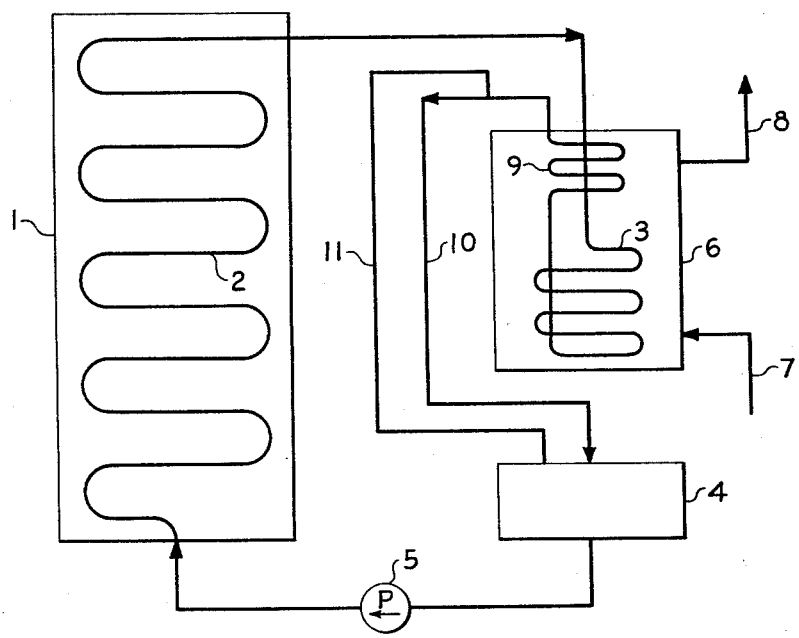

Water heating systems employing a water holding tank, heat storage system and a means for transferring heat from the storage unit to water in the holding tank are known. Conventionally, water is used as the heat transfer medium between the heat storage material and the water in the holding tank. The water (heat transfer medium) is passed in heat transfer relationship through a conduit which is surrounded by the heat storage material. The water (heat transfer medium) is vaporized. The vapor passes in heat transfer relationship through a condenser within the water of the holding tank, where it gives up its heat. The condensed heat transfer medium is removed from the water holding tank and held in a condensate reservoir from which it is pumped back into heat transfer relationship with the heat storage material to complete a transfer cycle.

Alkali metal hydroxide compositions are excellent heat storage materials, because of their high heat capacities. In practice, the temperature of an alkali metal hydroxide heat storage composition is usually maintained between about 200–900° F., although heat may be stored at temperatures as high as about 1250° F. and above for certain applications. The alkali metal hydroxides themselves have melting points which range from about 522° F. for cesium to about 841° F. for lithium. The incorporation of additives such as corrosion inhibitors and nonreducing agents into the alkali metal hydroxide heat storage composition affords mixtures with different melting points.

When a heat storage material is used, in which a very large temperature differential resides between the temperature of the storage material and the temperature of the hat transfer medium initially entering into heat transfer relationship with the storage material, rapid vaporization of the heat transfer medium occurs within the heat transfer conduit entering the heat storage unit. This large temperature differential is a characteristic and basic attribute of alkali metal heat storage compositions. Likewise, the steam within the heat transfer conduit may condense in the cool water being introduced into the steam coil (heat transfer conduit). This re-condensation of steam into the heat transfer medium entering the steam coil may occur as a result of "film boiling" of water at the entrance of the coil with entrainment of the steam in the turbulent flow of water near the initial coil in the steam conduit. The recondensation of entrained steam may cause a sudden pressure drop and knocking.

In any event, sudden pressure fluctuations caused by the instantaneous expansion of water into steam, or by the dissolution of steam into the cooler water entering the steam coil which traverses the heat storage material, creates a knocking which can become quite violent within the heat transfer conduit. These sudden pressure fluctuations may also be caused by the siphoning of condensate from the condenser in the water holding tank into the condensate reservoir. This siphoning action can cause pressure fluctuations within the system which would result in the knocking phenomenon of the heat transfer conduit. However, since I do not know the exact cause of the knocking within the heat transfer conduit, I do not wish to be bound by the theoretical considerations advanced above.

It is an object of this invention to reduce the knocking of heat transfer medium, specifically water, in the conduit of a heat storage container.

It is also an object of this invention to prevent pressure fluctuations created in a heat transfer medium as it passes into a steam coil in heat transfer relationship with a heat storage material.

It is also an object of this invention to prevent pressure fluctuations created by siphoning of condensed heat transfer medium from a condenser in the conduit through which a heat transfer medium passes.

Summary of the invention

I have discovered that by providing an entrance temperature of about 150° F. for the heat transfer medium passing into a heat storage tank, the knocking attending the introduction of unheated transfer medium is significantly reduced.

I have also discovered that pressure fluctuations in the vaporizing heat transfer medium in the steam coil caused by the siphoning of condensate from the condenser may be prevented by a siphon break.

The water used as a heat transfer medium may be heated to about 150° F. or above, prior to its introduction into the heat storage vessel, by any means. For example, the condensate held in a reservoir external to the hot water tank may be directly heated to the desired temperature. The insulation surrounding the wall containing the heat storage medium may be provided with a preheat conduit to achieve the desired temperature. An external heat exchanger through which the condensate may be circulated prior to introduction into the condensate reservoir is applicable. Although, any method of preheating the heat transfer medium is applicable, I have found that an advantageous arrangement is that depicted in FIGURE 1, and the most preferred embodiment is the combination of the preheat coil disposed within the water holding tank illustrated in FIGURE 1 with the thermostat and electric heater disposed within the condensate reservoir illustrated in FIGURE 3.

Detailed description of the invention

FIGURE 1 presents a diagrammatic view of a heat storage vessel and a hot water holding tank, illustrating condensate reheating by the use of a reheat coil in the hot water tank.

Figure 2:
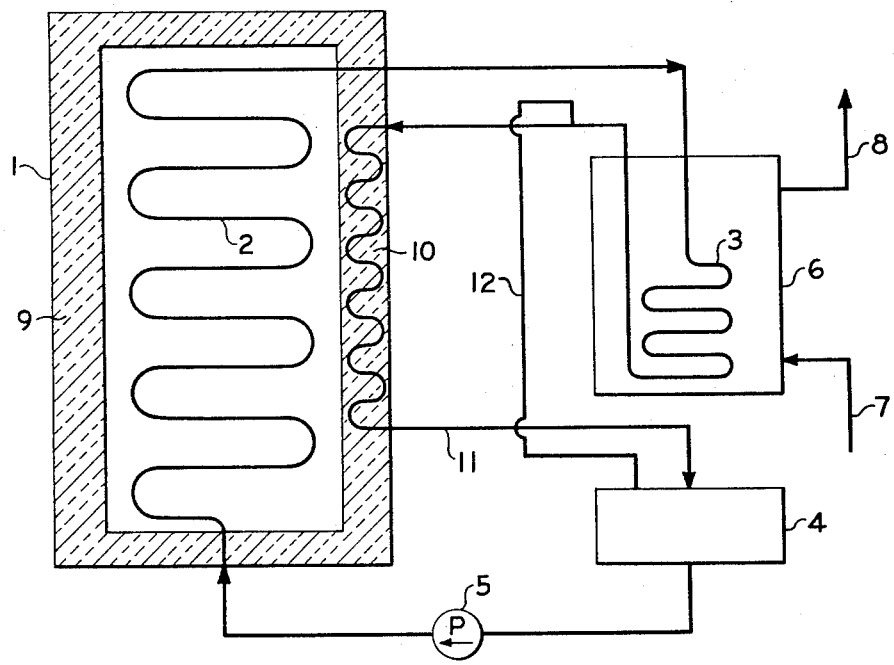

FIGURE 2 presents a diagrammatic view of a heat storage vessel and a hot water holding tank, illustrating condensate reheating by the use of a reheat coil disposed in the insulated wall of the heat storage vessel.

Figure 3:
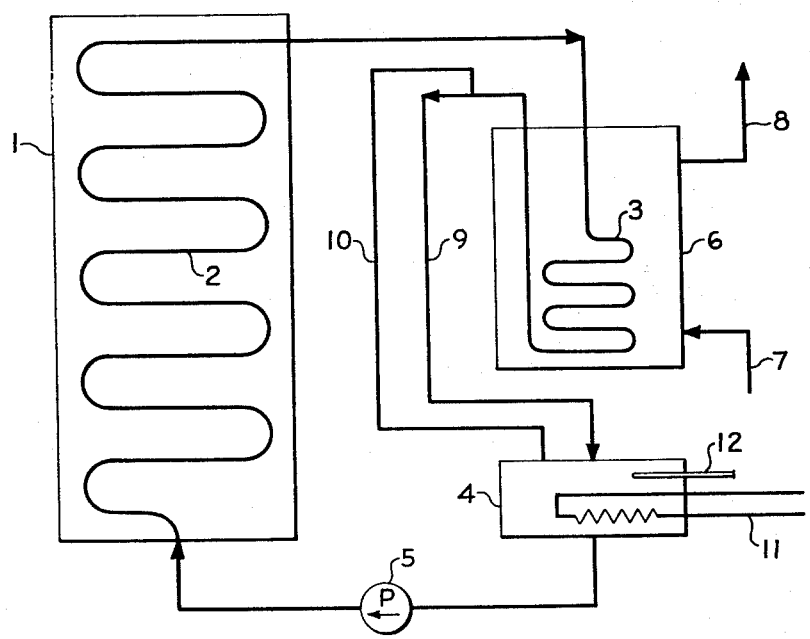

FIGURE 3 presents a diagrammatic view of a heat storage vessel and a hot water holding tank, illustrating the direct heating of condensate with an immersed heater in the condensate reservoir.

Figure 4:
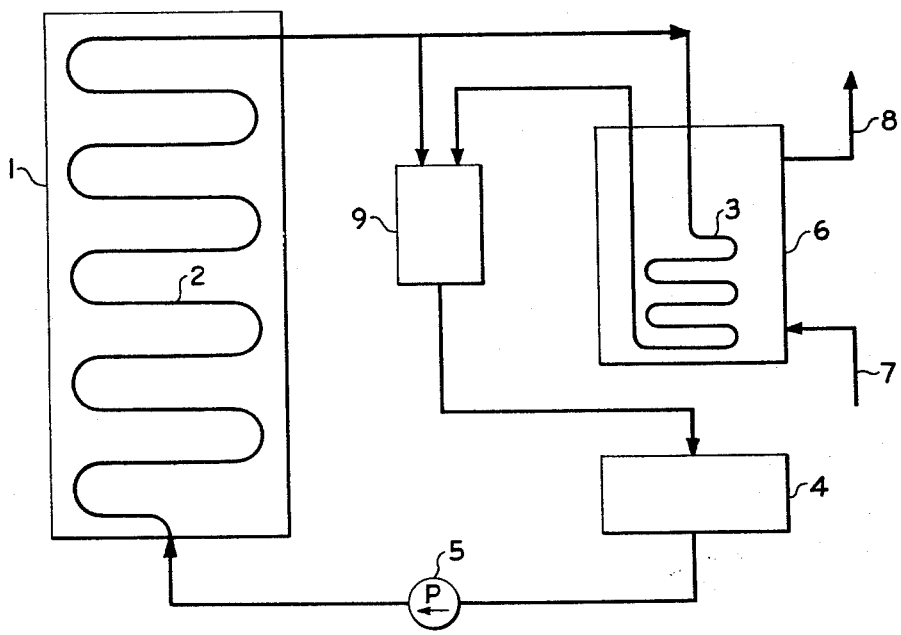

FIGURE 4 presents a diagrammatic view of a heat storage vessel and a hot water holding tank, illustrating condensate heating with an external heat exchanger.

Referring to FIGURE 1, in operation, steam is generated in steam coil 2, by heat transfer from heat storage tank 1. The steam enters the hot water holding tank 6. The steam passes into the condenser 3 where it gives up its heat to the water in the holding tank. The condensate passes to the reheat coil 9 where its temperature is raised to about 150° F. or above. The reheated condensate enters the condensate return line 10 and is conveyed to the condensate reservoir 4 for storage until it is recycled through the heat storage vessel by means of pump 5. A siphon break 11 is inserted between the condensate line 10 and the condensate reservoir 4 to prevent pressure fluctuations created by the siphoning of condensate from the condenser into the reservoir. The siphon break in essence maintains atmospheric pressure at the head of the liquid column leading from the condenser. Lines 7 and 8 represent the cold water inlet and hot water outlet for the water tank, respectively.

Referring to FIGURE 2, its operation is substantially the same as the apparatus presented in FIGURE 1. Heat storage vessel 1 is provided with insulated 9 walls through which coil 2 traverses the contained body of heat storage material. Steam is generated in steam coil 2, passes into the hot water holding tank 6, into condenser 3, and then passes through a reheat coil 10 disposed within the insulation 9 of the heat storage vessel wall. The reheated condensate then passes through condensate return line 11 to the condensate reservoir 4, from which the condensate is recycled through the steam coil 2 by means of pump 5. A siphon break 12 is disposed between the condensate return line 11 and the reservoir 4. Lines 7 and 8 represent the cold water inlet and the hot water outlet, respectively.

FIG. 3 presents an illustration of direct heat application to the condensate in the condensate reservoir by means of heater 11 which is controlled by thermostat 12. Steam generated in steam coil 2 which traverses the heat storage material housed in heat storage vessel 1, passes into hot water tank 6 where it gives up its heat to the water within the holding tank 6 and condenses in condenser 3. The condensed heat transfer fluid passes out the top of the hot water holding tank 6 to a reservoir 4 disposed at a level near the bottom of the hot water tank through condensate return line 9. A siphon break 10 is disposed between the condensate return line 9 where it leaves the top of the hot water tank and the condensate reservoir 4. Electric heater 11, controlled by thermostat 12, maintains the temperature of the condensate in reservoir 4 at 150° F., or above, so that knocking will not occur when the condensate is returned to steam coil 2 by means of pump 5. Lines 7 and 8 represent the cold water inlet and the hot water outlet of the hot water holding tank 6, respectively.

FIG. 4 illustrates the use of an external heat exchanger to reheat condensate from the hot water holding tank. In operation, steam generated in steam coil 2 which traverses the heat storage material contained within heat storage vessel 1 passes into the hot water holding tank 6 and into heat exchanger 9. The steam within water tank 6 gives up its heat and condenses in condenser 3, from which it passes into the external heat exchanger 9, where it is reheated to 150° F. or above. The reheated condensate leaves heat exchanger 9 and passes into the condensate reservoir 4 from which it is recycled to the steam coil 2 by means of pump 5. Lines 7 and 8 represent the cold water inlet and the hot water outlet of the hot water holding tank 6, respectively.

Having disclosed my invention, it will become apparent to those skilled in the art that modifications may be made which will not depart from the true scope of my contribution. For example, the use of any means to pre-heat the heat exchange fluid before it is passed into the conduit leading through the heat storage material will effectively prevent the knocks evidenced when cool transfer fluid enters the heat storage tank. My invention, in its broadest sense, is the discovery that knocking in a heat storage container-hot water holding tank system can be prevented by pre-heating the heat transfer fluid prior to its entrance into heat transfer relationship with the heat storage material.

What is claimed is:

1. A fluid heating unit comprising a heat storage vessel for a heat storage medium; a fluid storage vessel equipped with means for fluid introduction and withdrawal; a conduit for heat transfer medium passing through the heat storage medium and the fluid in the storage vessel and connecting the heat storage container and the fluid storage vessel, so as to form a circuit, said conduit forming a condenser in the fluid storage vessel; and a preheating means in said circuit between the condenser and the heat storage vessel inlet.

2. The fluid heating unit of claim 1 in which said pre-heater is a section of conduit in the upper region of the fluid within the fluid storage vessel.

3. The fluid heating unit of claim 1 in which the heat storage vessel is equipped with insulated walls and the pre-heater is a section of conduit traversing the insulated wall of the heat storage container.

4. The fluid heating unit of claim 1 in which a condensate reservoir is provided after the condenser and said pre-heater is a thermostatically controlled heating element disposed in the condensate reservoir.

5. The fluid heating unit of claim 1 in which the pre-heater is a heat exchanger external to the heat storage container and the fluid storage vessel, to which heat is supplied by a portion of the heat transfer medium leaving the heat storage container.

6. The fluid heating unit of claim 2 in which a condensate reservoir is provided after the condenser and the condensate reservoir is provided with a thermostatically controlled heating element.

7. The fluid heating unit of claim 1 in which a siphon break is present in the conduit between a condensate reservoir and the head of the conduit leading from the condenser disposed in the fluid of the storage vessel.

8. A process for preventing pressure fluctuations within a heat transfer conduit of a heat exchange system comprising a heat storage unit and a hot water tank with the heat transfer conduit forming a circuit connecting the heat storage unit and the hot water tank, which comprises passing the heat transfer medium to a pre-heater prior to its introduction into heat transfer relationship with the heat storage material.

9. The process of claim 8 in which the liquid heat transfer medium is pre-heated to about 150 degrees Fahrenheit.

10. The process of claim 8 in which the pre-heater is a heat exchanger disposed in the upper regions of the hot water holding tank.

11. The process of claim 8 in which the pre-heater is a thermostatically controlled electric heating element disposed in a condensate reservoir.

12. The process of claim 10 in which the said pre-heater is supplemented by a thermostatically controlled electric heating element disposed in a condensate reservoir.

13. The process of claim 8 in which the pre-heater is a heat exchanger disposed in an insulated wall of the heat storage unit.

14. The process of claim 8 in which the preheater is a heat exchanger, external to the heat storage container and the hot water tank, to which heat is supplied by a portion of the heat transfer medium leaving the heat storage container.

15. The process of claim 8 in which pressure fluctuations caused by the siphoning of condensate from a condenser disposed within the hot water tank are prevented by a siphon break.

References Cited
UNITED STATES PATENTS

| | | | |
|---|---|---|---|
| 2,936,741 | 5/1960 | Telkes | 122—32 |
| 3,062,510 | 11/1962 | Percival | 122—32 X |
| 3,079,087 | 2/1963 | Herrick et al. | 122—32 X |
| 3,381,113 | 4/1968 | Jacques et al. | 126—400 X |
| 3,382,917 | 5/1968 | Rice | 122—32 X |

ROBERT A. O'LEARY, *Primary Examiner.*

ALBERT W. DAVIS, *Assistant Examiner.*

U.S. Cl. X.R.

165—66, 107; 126—400; 122—32